(12) United States Patent
Upadhya et al.

(10) Patent No.: US 10,897,288 B2
(45) Date of Patent: Jan. 19, 2021

(54) TRANSMITTING METHOD IN MULTIPLE INPUT AND MULTIPLE OUTPUT ANTENNA SYSTEM

(71) Applicant: Nokia Technologies Oy, Espoo (FI)

(72) Inventors: Karthik Upadhya, Espoo (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/830,948

(22) Filed: Mar. 26, 2020

(65) Prior Publication Data

US 2020/0322009 A1   Oct. 8, 2020

(30) Foreign Application Priority Data

Apr. 5, 2019  (FI) .................................... 20195282

(51) Int. Cl.
*H04B 7/0456* (2017.01)
*H04L 5/00* (2006.01)

(52) U.S. Cl.
CPC ........... *H04B 7/0456* (2013.01); *H04L 5/006* (2013.01); *H04L 5/0044* (2013.01)

(58) Field of Classification Search
CPC ...... H04B 7/0456; H04L 5/0044; H04L 5/006
USPC ................................................ 375/295, 299
See application file for complete search history.

(56) References Cited

U.S. PATENT DOCUMENTS

| 2013/0039401 A1 | 2/2013 | Han et al. |
| 2015/0124688 A1 | 5/2015 | Xu et al. |
| 2018/0091195 A1* | 3/2018 | Carvalho ............. H04B 7/0469 |

FOREIGN PATENT DOCUMENTS

| WO | WO 2017/122176 A1 | 7/2017 |
| WO | WO 2018/172842 A2 | 9/2018 |

OTHER PUBLICATIONS

Thomas, C. K., et al., "Mixed Time Scale Weighted Sum Rate Maximization for Hybrid Beamforming in Multi-Cell MU-MIMO Systems", 2017 IEEE Globecom Workshops, Singapore, Dec. 4-8, 2017, 6 pgs.

(Continued)

*Primary Examiner* — Fitwi Y Hailegiorgis
(74) *Attorney, Agent, or Firm* — Harrington & Smith (57) ABSTRACT

There is provided a method in a network node for controlling multiple input multiple output antenna system, the method including obtaining a plurality of time domain symbols to be transmitted, the plurality of time domain symbols including time domain symbols to be broadcasted via the multiple input multiple output antenna system; determining a mapping between the plurality of time domain symbols and parameters of control units associated with respective antenna elements of the multiple input multiple output antenna system, each control unit including a phase shifter, wherein the parameters control values of the phase shifters, and wherein the mapping is performed based on an algorithm for minimizing distortion and/or bit error rate at receiving user equipment; causing applying the parameters at the control units; and causing transmission of the plurality of time domain symbols via the multiple input multiple output antenna system.

19 Claims, 6 Drawing Sheets

(56) References Cited

OTHER PUBLICATIONS

Kazemi, Mohammad, et al., "Discrete-Phase Constant Envelope Precoding for Massive MIMO Systems", IEEE Transactions on Communications, vol. 65, No. 5, May 2017, pp. 2011-2021.
Shao, Mingjie, et al., "Discrete Constant Envelope Transceiver Design for Multiuser Massive MIMO Downlink", IEEE, 2019, pp. 4684-4688.

* cited by examiner

TRANSMITTING METHOD IN MULTIPLE INPUT AND MULTIPLE OUTPUT ANTENNA SYSTEM

TECHNICAL FIELD

The invention relates to communications.

BACKGROUND

In a communication network, Multiple Input Multiple Output (MIMO) antenna system may be used to transmit information to plurality of receivers. Such system may utilize beamforming and therefore the transmission(s) may be performed utilizing one or more antenna beams. As the number of antenna elements utilized in such systems increases, there is a growing need to find solutions that enable more efficient ways to perform transmissions. For example, it may be beneficial to find new cost-efficient ways to control parameters related to the antenna elements.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
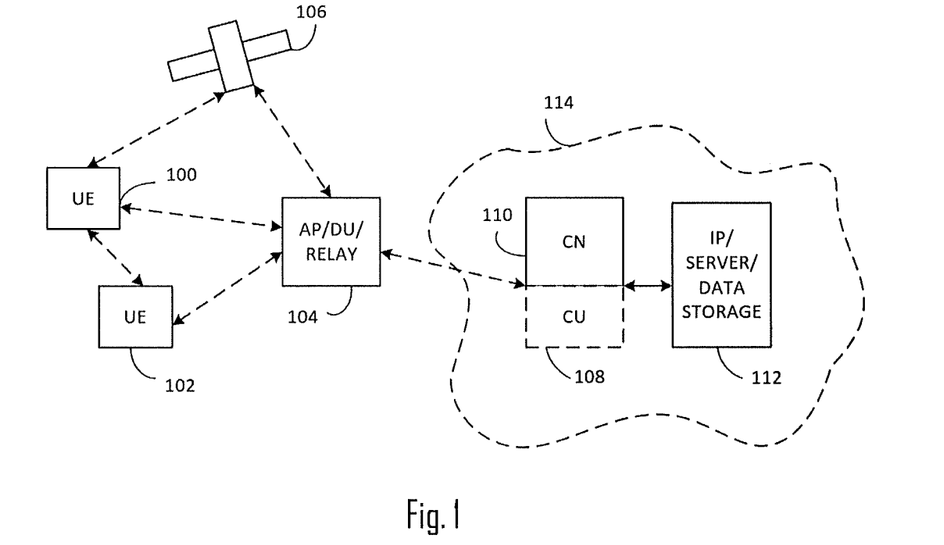
FIG. 1 illustrates an example a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g)NodeB) providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, pico- or femtocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Current 4G base stations and network nodes may support a maximum of 8 antennas per sector. Base station costs (i.e. capital and operating) may scale linearly with the number of antenna elements. Future base stations and network nodes are expected to employ orders of magnitude more antennas, and hence it may be beneficial to reduce the cost-per-antenna-element to reduce overall costs. One component of the per-element cost may be attributed to the radio-frequency (RF) power amplifier and digital-to-analog converter (DAC). Conventional RF power amplifiers are operated in the less power-efficient linear region to preserve signal integrity, while typical transmit chains employ expensive and power-hungry high-resolution DACs, whose cost and power consumption scales exponentially with the resolution.

One approach may be to fundamentally change the transmitter architecture by replacing the high-resolution DAC at each antenna with cheaper and more power-efficient components, namely, a finite-resolution (with support also for low-resolution) RF/baseband phase-shifter and/or switch. The phase-shifter, or any equivalent component (e.g. hardware component) which modifies or outputs a constant envelope signal, may be used for changing the phase of the transmitted signal and the switch, or any equivalent component, may be used to enable or disable the antenna element. In the absence of the switch, using phase-shifters may enable constant-envelope precoding, wherein the waveform that is input to the power amplifier may only be phase-modulated and consequently may have a constant envelope. Such architectures may have the potential to relax the linearity requirements on the power amplifier, thereby reducing its cost, and allow for it to be operated in the saturation region, where it may be more power efficient.

Beamforming to UEs with finite-resolution phase-shifters/switches may be accomplished through non-linear symbol-level precoding, which may involve mapping each information symbol to the state of the phase-shifter/switch at each antenna element. For UE(s) with channel state information (CSI) available at the transmitter (i.e. CSIT), several low-complexity non-linear symbol-level precoding algorithms have been proposed. Another challenge in massive multi-user multiple-input multiple-output (MU-MIMO) BSs or network nodes is the transmission of information to UEs in the absence of CSIT. Such transmission(s) may be necessary, for instance during initial access, when the CSI corresponding to the UE is not available at the BS.

Therefore, a solution is proposed to address the problem of making low-cost MIMO solutions that have adequate or good enough performance. The solution proposes an approach for transmission of information to UE(s) without CSIT. This transmission could be performed jointly to UE(s) with CSIT over the same time-frequency resource, or to UE(s) with CSIT over partially or fully non-overlapping time-frequency resources, all while using finite-resolution phase-shifters and/or switches for beamforming at each antenna element.

Figure 2:
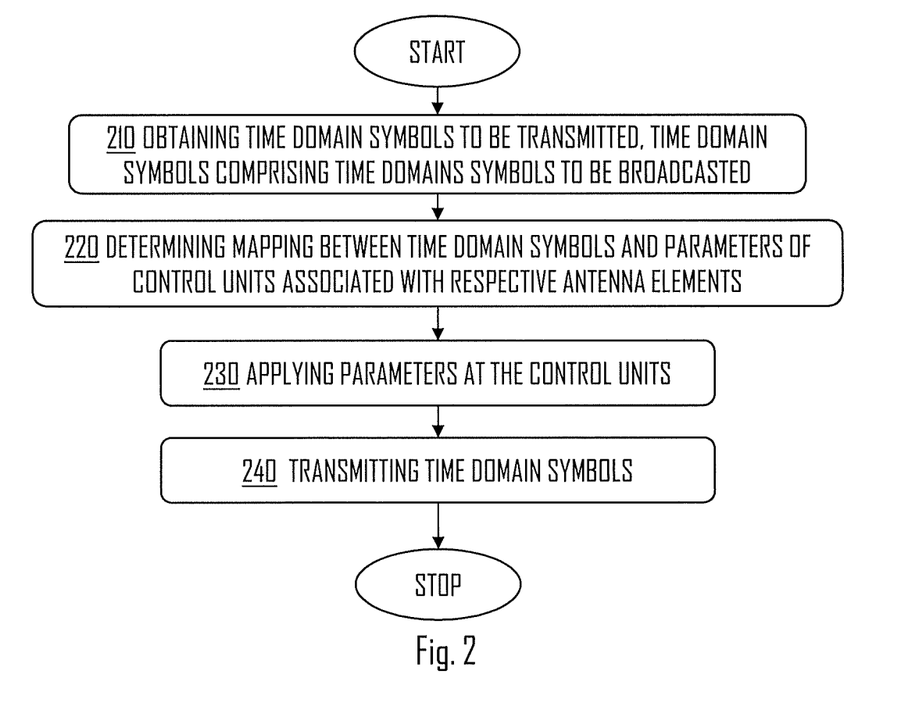
FIG. 2 illustrate a flow diagram according to an embodiment.

FIG. 2 illustrates a flow diagram according to an embodiment. Referring to FIG. 2, a method in a network node for controlling multiple input multiple output (MIMO) antenna system is shown, wherein the method comprises: obtaining (210) a plurality of time domain symbols to be transmitted, the plurality of time domain symbols comprising time domain symbols to be broadcasted via the multiple input multiple output antenna system; determining (220) a mapping between the plurality of time domain symbols and parameters of control units associated with respective antenna elements of the multiple input multiple output antenna system, each control unit comprising a phase shifter and/or a switch, wherein the parameters control values of the phase shifters and/or switches; causing applying (230) the parameters at the control units; and causing transmission (240) of the plurality of time domain symbols via the multiple input multiple output antenna system.

The mapping (i.e. of block 220) may be performed/determined based on an algorithm which minimizes a performance metric, such as distortion and/or Bit Error Rate (BER) at the receiving user equipment. The receiving user equipment may refer to one or more user equipment.

The BER at the receiving user equipment may refer, for example, to BER of the receiving UE.

The distortion at the receiving user equipment may denote, in some examples, a function of the distortion at the receiving user equipment.

In an embodiment, minimizing the distortion refers to minimizing average distortion at the receiving user equipment.

At least two different examples of utilizing the algorithm are given in the examples below. It is also noted that it may be possible to use some other performance metric, in addition or as an alternative, to the distortion and/or BER.

The network node performing the method may be or be comprised in for example AP/DU/Relay 104. It is possible that the MIMO antenna system is comprised in same network node or in some other network node. Therefore, it is possible that the network node controls an internal or external MIMO antenna system. Furthermore, the network node may refer to one physical entity or to a network of entities collaborating with each other. For example, the network node may be a virtual network function (VNF) that is run on physical resources.

Figure 3:
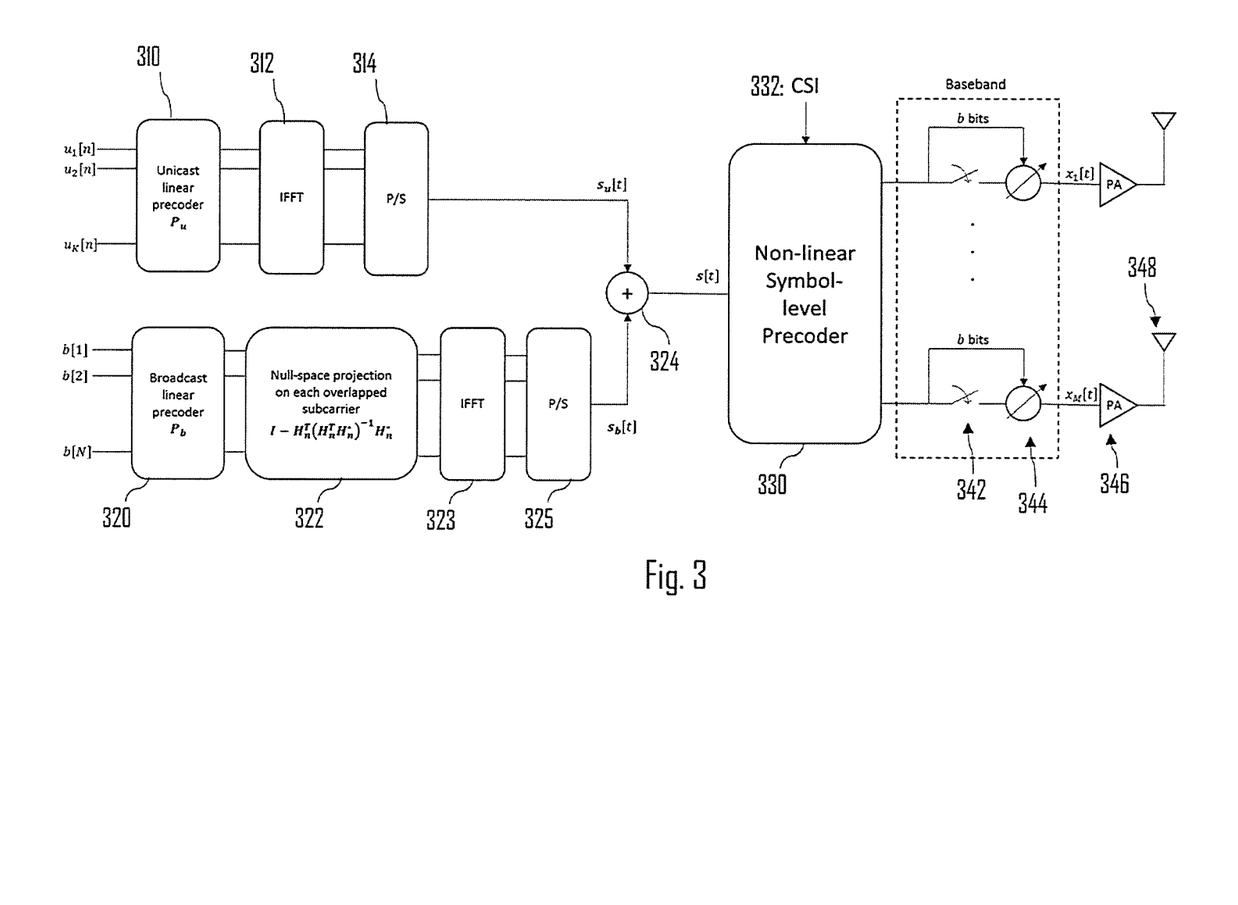
FIG. 3 illustrates an embodiment.

Let us take a look at FIG. 3 illustrating an embodiment in which transmission of time domain symbols to unicast and broadcast UEs is utilized. That is, the network node may cause the MIMO antenna system to transmit to unicast and broadcast UEs over the same time-frequency resource or over partially or fully non-overlapping time-frequency resources. Unicast UE may refer UE to which the network node causes the MIMO antenna system to transmit a unicast transmission. Respectively, broadcast UE may refer to UE to which the network node causes the MIMO antenna system to transmit broadcast transmission. It is noted that in the case of broadcast transmission, the transmission may not necessarily have a target as in unicast transmission. Therefore, the broadcast transmission may be a general broadcasting transmission targeted to one or more UEs of which the network node may or may not have information. For example, unicast transmission may be targeted to a UE of which the network node has obtained Channel State Information (CSI). CSI on the UE may be referred to as CSI at transmitter (CSIT) which indicates CSI regarding the UE. On the other hand, broadcast transmission may be targeted to UE(s) of which the network node has no CSI. Therefore, in essence, unicast transmission to UE may be referred to transmission with CSIT and broadcast transmission may be referred to as transmission without CSIT. So, e.g. the broadcasting of the time domain symbols may be performed to UEs without CSI. Also, e.g. unicasting of time domain symbols may be performed to UEs with CSI.

In an embodiment, the transmission to unicast and broadcast UEs over the same time-frequency resource is referred to as joint transmission.

Referring to FIG. 3, in the case of joint transmission of unicast and broadcast transmissions (i.e. a unicast transmission and a broadcast transmission; a unicast transmission and broadcast transmissions; unicast transmissions and broadcast transmissions; or unicast transmissions and a broadcast transmission), broadcast information may be precoded with a vector that lies in the null-space of the CSI estimated in the uplink, to prevent the broadcast transmission from interfering with the unicast transmission. This may be possible as in MIMO antenna systems, the number of antenna elements may be considerably greater than the number of unicast UEs, thereby allowing use of the excess degrees of freedom at the network node to be used to transmit the broadcast information simultaneously alongside the unicast transmission. It may be observed, based on evaluating spectral efficiencies for the unicast and broadcast UEs, that the total transmit power required for joint transmission for a target spectral efficiency may be lower than that required when the unicast and broadcast transmissions were transmitted in non-overlapping time-frequency resource blocks. However, to this date, there has been no solutions which utilize finite-resolution phase shifter(s) and/or switch(es) in implementing this kind of joint transmission protocol. i.e. non-linear components (e.g. phase shifter and switch) may be used instead of linear components, such as high-resolution Digital-to-Analog Converters (DAC) and linear power amplifiers, which are expensive and power hungry. Note that the solution mentioned in this paragraph may subsume the scenario where the unicast and broadcast transmissions are made over partially overlapping or non-overlapping time-frequency resources.

So, now referring to FIG. 3, one example of how to perform the joint transmission is given. Unicast information symbols or streams corresponding to K different users (i.e. $u_1[n], \ldots, u_K[n], \forall n=1, \ldots N$) may be precoded (e.g. with a unicast linear precoder 310) over N subcarriers. The precoding may be performed utilizing, for example, precoding scheme $P_u$ such as zero-forcing (ZF) or minimum mean-squared error (MMSE). The precoding may be performed in the baseband.

Time domain symbols ($s_u[t]$) may be generated/obtained based on precoded unicast information symbols or streams. For example, the $s_u[t]$ may be obtained by performing Inverse Fast Fourier Transform 312 (IFFT) on the precoded symbols or streams. Parallel to Serial (P/S) converter 314 may further be utilized in the process as known in the art.

In an embodiment, the time domain symbols $s_u[t]$ are amplitude and phase modulated. For example, the time domain symbols may be orthogonal frequency-division multiplexing (OFDM) symbols.

In an embodiment, the time domain symbols $s_b[t]$ are amplitude and phase modulated. For example, the time domain symbols may be orthogonal frequency-division multiplexing (OFDM) symbols. In an embodiment, the time domain symbols $s_b[t]$ are phase modulated, but not amplitude modulated.

In an embodiment, the time domain symbols are amplitude and/or phase modulated or OFDM modulated.

It is noted that even in the case of OFDM with subcarriers carrying phase-only modulated signals, the actually transmitted signal may be both amplitude and phase modulated.

Still referring to FIG. 3, broadcast information symbols or streams (i.e. $u_B[1], \ldots, u_B[N]$) over N subcarriers may be precoded using the matrix $P_b$ (see e.g. block 320). In the case where sub-carrier $n \in [1,N]$ also carries a unicast information symbol or stream (i.e., the unicast and broadcast information symbols are transmitted over the same time-frequency resource), the precoding matrix $P_b$ is further projected onto the null-space of the unicast channel matrix on subcarrier n i.e., $H_n$ through projection matrix $P_{H_n^\perp} \triangleq I - H_n^T(H_n^T H_n^*)^{-1} H_n^*$, where $(\cdot)^T$, $(\cdot)^*$, and $(\cdot)^{-1}$ denote the matrix transpose, complex conjugation and matrix inversion, respectively. The channel matrix $H_n$ is a collection of the channel coefficients between the M base station antennas and the K users on the $n^{th}$ subcarrier. Time domain symbols ($s_B[t]$) may be generated/obtained based on precoded broadcast information symbols or streams. For example, the $s_B[t]$ may be obtained by performing Inverse Fast Fourier Transform 323 (IFFT) on the precoded symbols or streams. Parallel to Serial (P/S) converter 325 may further be utilized in the process as known in the art.

The resulting broadcast symbol $s_b[t]$ may be added 324 to $s_u[t]$ and the combined symbol $s[t] \triangleq s_u[t] + s_b[t]$ may be inputted to the non-linear symbol-level precoder 330. Combined symbol may refer to time domain symbol combination obtained from the unicast and broadcast symbols or streams. One or more combined symbols may be obtained using the described architecture.

In an embodiment, both the unicast and broadcast time domain symbols are amplitude and phase modulated. So, for example, the unicast time domain symbols may be OFDM modulated while the broadcast time domain symbols are quadrature amplitude modulated (QAM) modulated.

The nonlinear symbol level precoder 330 may convert the combination s[t] into (b+1) bits at each of M (where M is a positive integer number and indicates the number of antenna elements in the MIMO antenna system) antenna elements 342, 344, 346, 348. It is noted that only one antenna element 348 and associated control unit (e.g. including elements 342, 344) is shown with reference signs in FIG. 3. However, there can be more than one antenna element (as also illustrated in the Figure) and associated control unit for each antenna element in the utilized MIMO antenna system. The bits b+1 may be used to control the state of the phase shifter 344 and/or state of the switch 342. So, in general each antenna element 342-348 may comprise an antenna element 348 that resonates the signal into air interface. Further, each antenna element 348 may be associated with a control unit that comprises at least the phase shifter 344. The control unit may further comprise a switch 342. In some examples, the control unit may further comprise amplifier (PA) 346. Hence, the control unit may comprise phase shifter 344 (whose phase shift value may be controlled via parameters), switch 342 (whose state can be controlled via parameters) and/or PA 346. In some examples, the switch 342 can be comprised in the PA 346.

Figure 9:
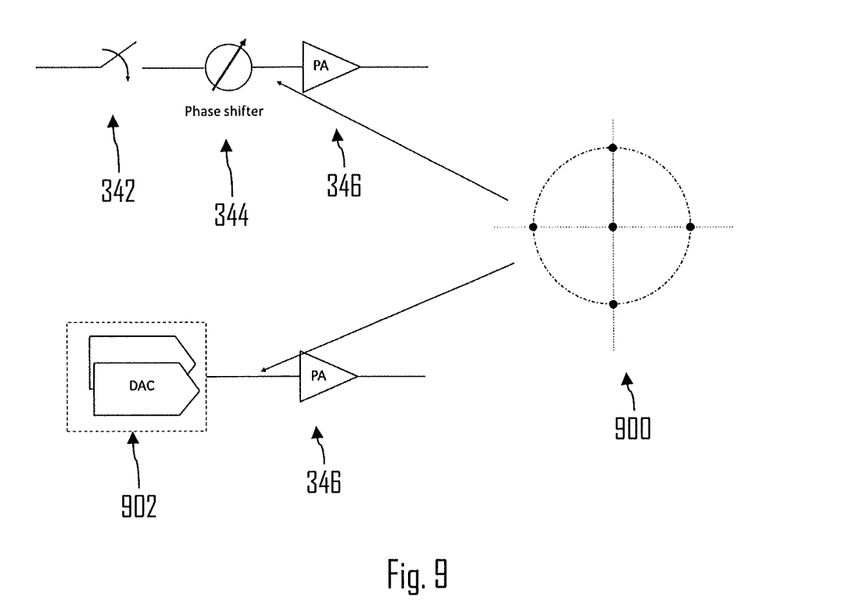
FIG. 9 illustrates an embodiment.

So, at each antenna element M, the bits b+1 may be used to control the state of the respective phase shifter 344 and/or switch 342. For example, b bits can be used to control state or value of the phase shifter 344 (i.e. phase shift value) and the remaining one bit can be used to control state of the switch (i.e. open or closed). The phase shifters 344 may be for example low-resolution Radio Frequency (RF)/Baseband (BB) phase-shifters. Each control unit associated with a respective antenna element may comprise, for example, one phase shifter 344 and one switch. The phase-shifter and switch combination may set the amplitude and phase of the carrier signal, after which the amplitude and phase may take a finite set of values, as depicted in example of FIG. 9. This functionality can also be mimicked through a b+1 bit digital-to-analog convertor 902. Further similar amplifier 346 can be used with the converter 902 as with the phase shifter-switch combination. Hence, in some embodiments, the switch 342 and phase shifter 344 can be replaced with DAC (e.g. b+1 bit DAC) 902. In FIG. 9, two different options for obtaining the signal constellation 900 are shown. Hence, not both are needed. Signal constellation 900 is depicted in a form known by the skilled person (i.e. quadrature and in-phase carriers as axis and signal represent by means of location on the quadrature and in-phase carrier axis). For example, by selecting different switch and phase shift values, different signal constellation values can be obtained. The selected value of the signal constellation via switch and phase shift values can therefore represent a signal constellation that minimizes the distortion and/or BER at the receiver.

With the described approach, needed radio beams may be generated utilizing the MIMO antenna system. So, the precoder 330 may generate the mapping between the combined time domain symbols and control unit parameter values (e.g. b+1 bits). The generated mapping at the $m^{th}$ antenna may be referred to in this case as $x_m[t]$ (i.e. precoder's 330 output) which may control unit parameter values at each antenna element. So, the $x_m[t]$ may indicate switch state and phase shift values via respective parameters for each antenna element of the MIMO antenna system. In effect, the output of the nonlinear precoder at the $m^{th}$ antenna, which is denoted as $x_m[t]$, may take values from the alphabet $$\chi = \left\{ \left[ e^{\frac{j2\pi p}{2^b}} \right]_{p=0}^{2^b-1}, 0 \right\}$$

with cardinality $|\chi|=2^b+1$.

So, according to an embodiment with reference to FIG. 3, the method of FIG. 2 further comprises obtaining a time domain symbol combination based on unicast time domain symbols and broadcast time domain symbols; and determining the mapping (i.e. block 220) between the time domain symbol combination and the parameters of control units (i.e. parameters controlling the phase shift values and switch states at respective antenna elements). As discussed above, the determined parameters of the control units may be applied to the control units (e.g. switches and phase shifters), and the data transmitted accordingly (i.e. unicast and broadcast transmissions) via the antenna elements according to the parameter values (i.e. phase shift values and switch states).

As discussed above, the mapping between the parameters and the time domain symbols may be determined by using an algorithm for minimizing the distortion and/or BER at the receiving user equipment. In one example, this may mean that the distortion and/or BER at the receiving user equipment comprises distortion and/or BER both at the unicast and broadcast UEs. Such algorithm may be, for example, an iterative low-complexity algorithm that adjusts the phase-shifter 344 and switch 342 states at each antenna element 348. The algorithm may enable transmission of time domain symbols (e.g. both amplitude and phase modulated) to UEs with and without CSIT. The mapping between the transmitted information symbol and the phase-shifter value and switch state at each antenna element may be performed in order to minimize the distortion and/or BER of the received information symbols at the unicast and broadcast UEs. The algorithm may be implemented at the precoder 330, and the resulting output (i.e. $x_m[t]$, where m indicates antenna element index, e.g. $x_5[t]$ may indicate phase shift value and switch state at antenna element associated with index 5 (e.g. $5^{th}$ antenna element)) may be the mapping that indicates phase shift values and switch states (i.e. open or closed) at each antenna element.

In an embodiment, the algorithm is based at least on interference information on one or more unicast user equipment and interference information on one or more broadcast user equipment.

In an embodiment, the algorithm for minimizing average distortion and/or BER at the receiving user equipment is further based on additive noise information at the one or more unicast and one or more broadcast user equipment.

One example of the algorithm mapping s[t] to the M dimensional vector x[t] is given below. The algorithm (1) may be realized using the precoder 330 minimizing the total MSE at unicast and broadcast UEs:

$$x_{opt} = \arg\min_{x \in \chi^M, \alpha > 0} \|H^T(\alpha x[t] - s[t])\|^2 + \qquad (1)$$

$$\mathbb{E}_g\{|g^T(\alpha x[t] - s[t])|^2\} + K\alpha^2\sigma_u^2 + \alpha^2\sigma_b^2$$

where the first term (i.e. $H^T(\alpha x[t]-s[t])\|^2$) corresponds to the interference seen by the unicast UEs, the second term (i.e. $\mathbb{E}_g\{|g^T(\alpha x[t]-s[t])|^2\}$) corresponds to the interference seen by the broadcast UEs, and the last two terms correspond to the effect of the additive noise at the UE terminals. K denotes the number of unicast UEs. The parameter $\alpha$ is used to trade-off between the additive noise and the interference, and the matrix g is the channel vector between a broadcast UE and the network node. The parameters $\sigma_u^2$ and $\sigma_b^2$ represent the noise variances at the unicast and broadcast UEs, respectively. The non-convex problem presented in equation (1) may be solved using, for example, the following algorithm illustrated by the following pseudocode:

```
Inputs: s, R, H, I
Initialization: x = x_init, α = α_init
For iter = 1:I do
    S = {1, . . . , M}
    while S ≠ ∅
        (x*_m, m*) = arg_{x_m ∈ χ, m ∈ S} min F(x, α)
        (x_1, . . . , x_m, . . . , x_M)^T = (x_1, . . . , x_m*, . . . , x_M)^T
        S ← S \ {m*}
    end
```

$$\alpha = \frac{\mathfrak{R}\{s^H(HH^H + R)x\}}{x^H(HH^H + R)x + K\sigma_u^2 + \sigma_b^2}$$

End

Where $F(x,\alpha) = \|H^T(\alpha x[t] - s[t])\|^2 + \mathbb{E}_g\{|g^T(\alpha x[t] - s[t])|^2\} + K\alpha^2\sigma_u^2 + \alpha^2\sigma_b^2$ To compute the expectation in equation (1), it can be assumed that the broadcast UEs have channels with a pre-defined angular spread corresponding to the width of the beam, which in turn defines its spatial covariance matrix R. One such covariance matrix that generates a beam between the elevation and azimuth angle pairs $(\theta_1,\phi_1)$ and $(\theta_2,\phi_2)$ is given as follows:

$$R = \int_{\theta_1}^{\theta_2}\int_{\phi_1}^{\phi_2} a(\theta,\phi)a(\theta,\phi)^H p(\theta,\phi) d\theta d\phi$$

where $\theta$ and $\phi$ are the elevation and azimuth angles, respectively, $a(\theta,\phi)$ is the steering vector of the two-dimensional antenna array at the base station corresponding to these angles, and $p(\theta,\phi)$ is the probability density function of the channel paths. Note that in the case of a uniform linear array, R is no longer a function of $\theta$ and is computed as:

$$R_{az} = \int_{\phi_1}^{\phi_2} a(\phi)a(\phi)^H p(\phi) d\phi$$

The broadcast precoding matrix $P_b$ is computed using R in general. If the BS is equipped with a uniform linear array, $P_b$ may be defined as $P_b = U_{az}c$, where $U_{az}$ contains D eigenvectors of $R_{az}$ corresponding to the D largest eigenvalues and $c \in \mathbb{C}^D$ is an arbitrary vector with unit-modular elements. For a 2D planar array, $P_b$ may be similarly written as:

$$P_b = U_{el}cq^T$$

where $U_{el}$ is composed of the D largest eigenvectors of the elevation covariance matrix $R_{el}$, which in turn is defined as:

$$R_{el} = \int_{\theta_1}^{\theta_2} a(\theta)a(\theta)^H p(\theta) d\theta$$

and q is any constant-amplitude zero autocorrelation sequence. In practice, for low-resolution phase shifters, q may be a perfect binary or quaternary array or quantized Zadoff-Chu sequence, for example.

The cost function in equation 1 can also be modified to incorporate pre-distorting the transmitted information symbols to reduce the overall distortion. Often, it may not be possible to sufficiently null the interference seen by the unicast and broadcast UEs in equation (1) because of the small number of symbols in the constellation χ at each antenna element. Therefore, further enhancements in calculating $x_{opt}$ may be beneficial. One such approach is to pre-distort the information symbols $u_1[n], \ldots, u_K[n]$ and $b[t]$ so as to minimize the distortion and/or bit error rate at the unicast and broadcast UEs.

According to an embodiment, channel state information (CSI) 332 is available regarding the one or more unicast user equipment, and wherein channel state information is not available regarding the one or more broadcast user equipment. Example is shown in FIG. 3 in which the precoder 330 may obtain the CSI regarding the one or more unicast user equipment. Based on the CSI (or CSIT in this case), the network node may perform unicast transmission to the UE(s) on which the network node has CSIT. CSI may be reported by the UE(s) to the network node as known in the art. So, for example, the network node may perform, by utilizing the architecture of FIG. 3, joint transmission of amplitude and/or phase-modulated information symbols to UEs with CSIT and phase-modulated information symbols to UEs without CSIT.

Figure 4:
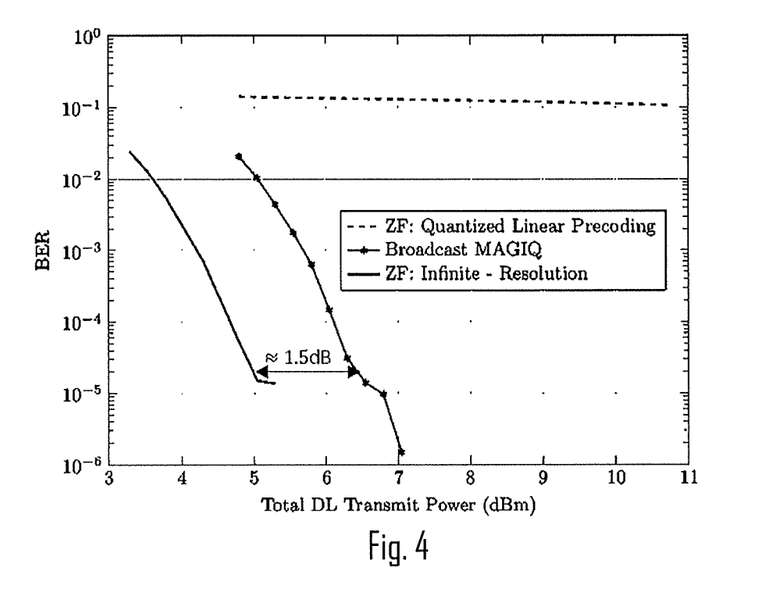
FIGS. 4 and 5 illustrate benefits obtained utilizing the described solution.
Figure 5:
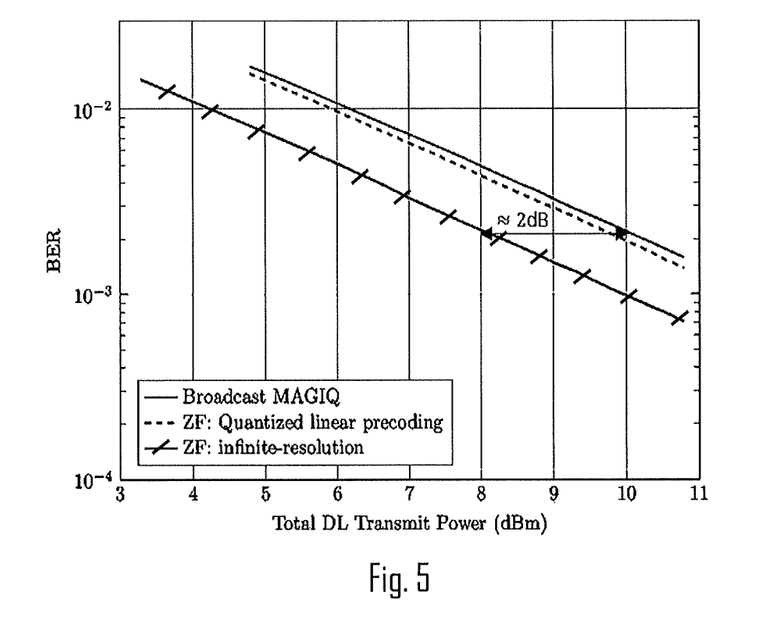

FIGS. 4 and 5 illustrate benefits obtained, for example, by utilizing the architecture and method described with respect to FIGS. 3 and 4. In the Figures, BER stands for Bit Error Rate; DL stands for Downlink; MAGIQ stands for Multi-Antenna, Greedy, Iterative, and Quantized (i.e. MAGIQ algorithm); ZF stands for Zero-Forcing; and dBm stands for decibel with reference to one milliwatt. The proposed solution, with joint unicast and broadcast transmission, may require lower transmit power than known orthogonal counterparts. Orthogonal counterparts may refer to cases where unicast and broadcast transmission happen over separate time-frequency resources. Moreover, the nonlinear equipment may be more cost efficient than the linear equipment requiring the use of DACs and linear power amplifiers.

The performance of the proposed algorithm has been demonstrated in FIGS. 4 and 5 with M=64, K=4, and with a broadcast channel beam-width of 11.25°. FIG. 4 may illustrate transmission efficiency on Physical Downlink Control Channel (PDSCH) and FIG. 5 on Physical Broadcast Channel (PBCH). However, different values may be utilized and these values should be understood as examples. In the example, the network node may communicate with the unicast UEs over 256 subcarriers with symbols drawn from a 16-quadrature amplitude modulation (QAM) constellation. The broadcast information symbols may be single-carrier modulated with symbols drawn from a QPSK constellation. The transmitted bits in the unicast and broadcast channels may be low-density parity-check (LDPC) coded with code-rates 1/2 and 2/3, respectively. In FIGS. 4 and 5, we see that around 1.5-2 dB additional transmit power may be needed for the low-cost hardware to achieve the same BER as its ideal counterpart (i.e. ZF: infinite resolution). However, it is noted that there is a reduction in power consumption and cost savings by using cheaper and more power-efficient components.

Figure 6:
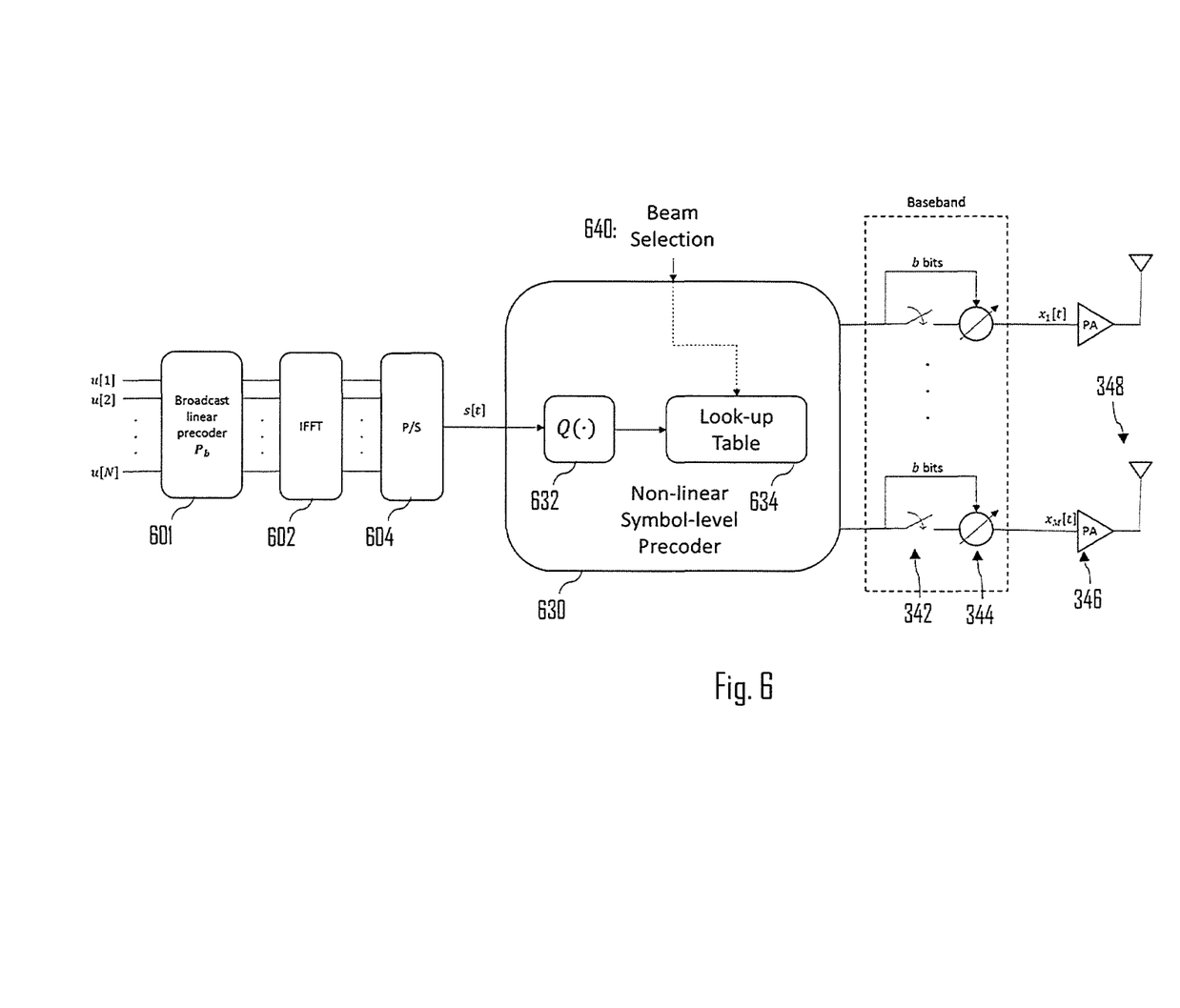
FIG. 6 illustrates an embodiment.

FIG. 6 illustrates an embodiment. Referring to FIG. 6, the nonlinear symbol level precoder is illustrated with reference sign 630. In this example, the time domain symbols to be transmitted may be time domain symbols to be broadcasted. Further, in this example, the time domain symbols to be broadcasted may be both amplitude and phase modulated. In an embodiment, in the example embodiment of FIG. 6, the time domain symbols comprise only time domain symbols to be broadcasted. Hence, there may be no time domain symbols to be unicasted. Therefore, the example architecture of FIG. 6 may be used for the transmission of amplitude and/or phase-modulated information symbols to UEs without CSIT in one or more broadcast channels.

The precoder 630 may utilize a look-up table 634 based algorithm which may map broadcast information symbols or streams (i.e. $u_1[n], \ldots, u_K[n], \forall n=1, \ldots N$) to the value of the phase shifter 344 and state of the switch 342 at each antenna element, in order to minimize/reduce the average distortion and/or BER at the broadcast UEs. So, value of the phase shifter 344 and state of the switch 342 corresponding to the broadcast information symbols or streams may be determined, wherein the mapping may indicate the correspondence.

In an embodiment, the method of FIG. 2 further comprises: generating a mapping between time domain symbols and parameters of the control units; storing the mapping in the look-up table 634; and utilizing the look-up table 634 in determining (i.e. in block 220) the mapping between the plurality of time domain symbols and the parameters of the control units 342, 344 (i.e. control unit associated with each antenna element 348). So, the mapping between time domain symbols and values of phase shifters and states of the switches may be determined and stored to the look-up table 634 before determining the mapping in block 220. So, the mapping may be precomputed offline and stored in the look-up table.

In an embodiment, mappings between time domain symbols and parameters of the control units are generated and stored for a plurality of different antenna beam directions. Beam selection 640 is shown in FIG. 6 and may be affected, for example, by the direction or location of the receiving UEs. The look-up table 634 may indicate mapping, for different beam directions, between the time domain symbols and the parameters controlling the phase shifters and switches. Thus, when the network node obtains certain time domain symbol(s) to be broadcasted, the network node may determine the parameters (i.e. phase shift values and switch states) based on the look-up table 634 values and the time domain symbols to be broadcasted. For example, for a given antenna beam direction and for a certain time domain symbol, the look-up table 634 may indicate phase shift value and switch state for phase shifters 344 and switches 342 at each antenna element 348. Thus, these parameters may be applied to the corresponding phase shifters 344 and switches 342, so that the needed time domain symbols are may be transmitted accordingly.

Referring still to FIG. 6, the information symbols to be broadcasted over N subcarriers u[1], . . . , u[N] may be precoded by utilizing a precoder 601 and modulated as a time domain symbol (e.g. OFDM symbol) s[t] by utilizing IFFT 602 and P/S 604.

In an embodiment, the time domain symbols s[t] is quantized with a quantizer 632. The quantizer may be a high-resolution quantizer. The quantized value, in conjunction with the choice of the beam direction (i.e. beam selection 640), may then be used to retrieve the corresponding vector x[t] from the look-up table 634 as described above, i.e., vector x[t] corresponding to the quantized time domain symbols s[t] may be retrieved from the look-up table 634. The vector x[t], as noted above, may indicate value of the phase shifter 344 and state of the switch 342 at each antenna element 348 of the MIMO antenna system. These values and states (sometimes referred to as parameters of the control unit or simply parameters) may then be applied to the corresponding phase shifters 344 and switches 342.

According to one example embodiment, the mapping between Q(s[t]) (i.e. referring to the quantized time domain symbols s[t]) and the vector x[t] is determined based on solving the following optimization problem (2) that minimizes the distortion and/or BER between the transmitted and received time domain symbols.

$$(x_{opt}, c_{opt}, \alpha_{opt}) = \arg \min_{x \in \chi^M, c, \alpha} \|Q(s[t])c - \alpha U^H x\|^2 + \alpha^2 \sigma_b^2 + \epsilon \|x\|^2 \quad (2)$$

where $\epsilon > 0$ is a regularization constant, U contains the eigenvectors corresponding to D largest eigenvalues of R, and $c \in \mathbb{C}^D$ is an optimization variable that has unit-modulus elements. Note that, similarly as above with respect to FIG. 3, the symbols u[1], . . . , u[N] may be pre-distorted to minimize the BER and/or the distortion at the UE. It is also noted that some parameters of equation (2) are defined with respect to equation (1) above.

The matrix R in Equation (2) is as defined earlier in this description. If the network node uses a uniform linear array, $R_{az}$ may be used instead of R. On the other hand, if the network node uses a 2D planar array, $R_{el}$ may be used to obtain the vector in the elevation direction $x_{opt}^{el}$. The precoding vector for the planar array may then be obtained as:

$$x_{opt} = x_{opt}^{el} q^T$$

where q was defined earlier.

According to an embodiment, the proposed method therefore may only require retrieving the vector x[t], from the look-up table 634, corresponding to the time domain sample being transmitted. Consequently, the run-time complexity of this method may be negligible. This may allow the optimization problem to be solved with sophisticated, non-real-time MIMO detection algorithms such as sphere decoding.

In an embodiment, the plurality of time domain symbols (i.e. block 210) only comprise time domain symbols to be broadcasted, and wherein the plurality of time domain symbols are broadcasted via the multiple input multiple output antenna system. For example, the broadcasted time domain symbols may be both amplitude and phase modulated.

In an embodiment, the time domain symbols to be broadcasted are targeted to one or more user equipment whose channel state information is not available (i.e. not CSIT available). So, transmission of amplitude and phase-modulated information symbols to UEs without CSIT may be performed utilizing the look-up table 634 without having CSI on the UEs to which the broadcasted time domain symbol(s) are targeted to. Hence, it is also possible to utilize rather non-dynamic look-up table 634 (e.g. computed offline) as the changing CSI may not affect the mapping between the time domain symbols and the parameters of the control units. This may be different than in the situation discussed with respect to FIG. 3 in which there can be CSI on the UEs to which the unicast transmission(s) are targeted to.

Figure 7:
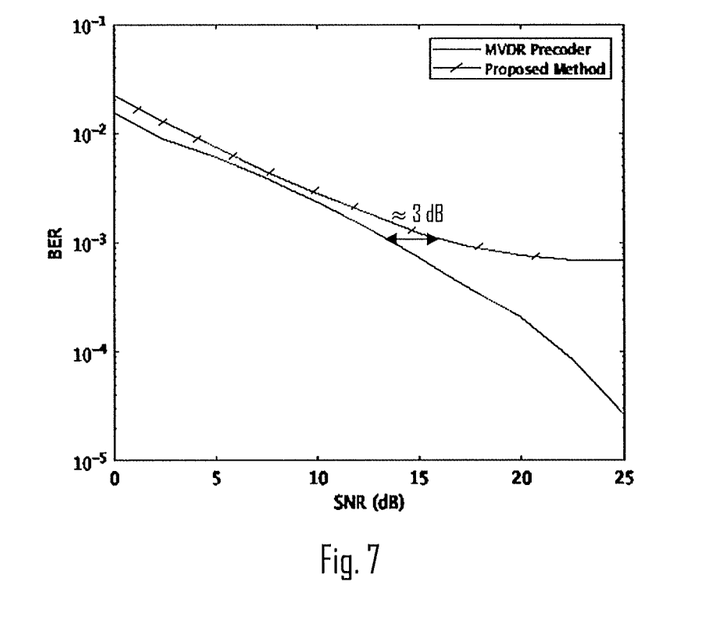
FIG. 7 illustrate benefits obtained utilizing the described solution.

FIG. 7 illustrates at least some benefits obtained by using the non-linear architecture of FIG. 6 in comparison with utilizing linear architecture. In FIG. 7, BER may refer to Bit Error Rate; SNR may refer to Signal to Noise Ratio, and MVDR may refer to Minimum-Variance Distortionless response.

The beam-width is 22.5° in the elevation direction and 180° in the azimuth direction. The beam for the linear network node is obtained using the MVDR algorithm. For both methods (i.e. MVDR and the now proposed non-linear method), in this example the network node has M=64 antennas arranged in an 8×8 planar array. The transmitted information symbols may be OFDM modulated with the symbol in each subcarrier drawn from a QPSK constellation. The transmitted information symbols are also pre-distorted to minimize the distortion. The transmitted bits may be LDPC coded with a rate-1/2 code. We see from FIG. 7 that to achieve a BER of 1e-3, the proposed method may need approximately 3 dB additional transmit power in comparison with the network node utilizing ideal linear hardware. However, the simplicity and cost effectiveness of the proposed solution is superior to the known linear solutions.

According to an embodiment, the mapping between the plurality of time domain symbols and the parameters of the control units are determined at a nonlinear time domain symbol level precoder 330, 630. Said precoder 330, 630 may be comprised in the network node discussed above.

In an embodiment, the network node performing the method indicated above (e.g. FIG. 2) comprises the precoder 330, 630. Further, the network node may comprise any of the element(s) indicated in FIGS. 3 and/or 6. For example, the network node may comprise the MIMO antenna system (e.g. antenna elements 348, switches 342, phase shifters 344, and/or amplifiers 346).

Figure 8:
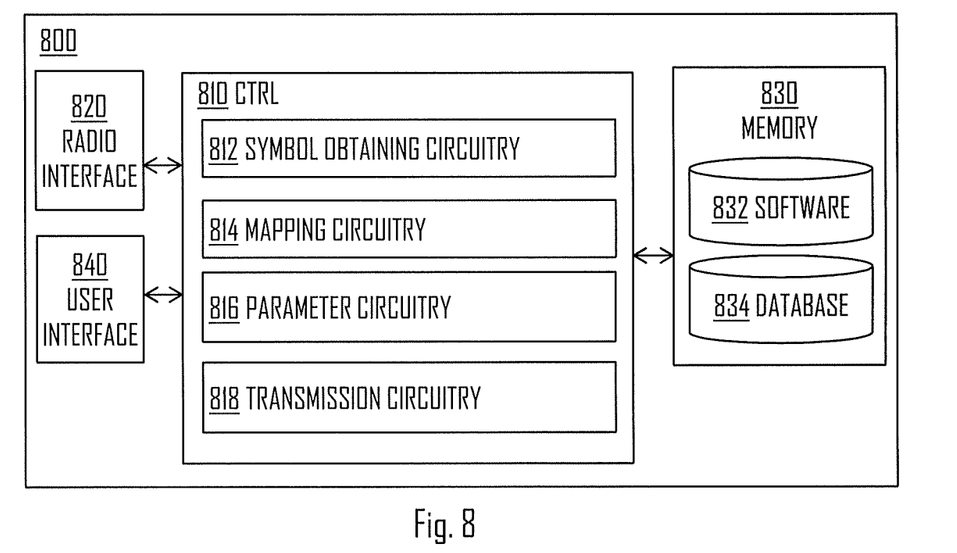
FIG. 8 shows an apparatus according to an embodiment.

FIG. 8 provides apparatus 800 comprising a control circuitry (CTRL) 810, such as at least one processor, and at least one memory 830 including a computer program code (software) 832, wherein the at least one memory and the computer program code (software) 832, are configured, with the at least one processor, to cause the respective apparatus 800 to carry out any one of the embodiments of FIGS. 1 to 7, and 9, or operations thereof.

Referring to FIG. 8, the memory 830, may be implemented using any suitable data storage technology, such as semiconductor based memory devices, flash memory, magnetic memory devices and systems, optical memory devices and systems, fixed memory and removable memory. The memory 830 may comprise a database 834 for storing data. For example, the look-up table 634 may be stored in the memory 830 and/or in the database 834.

The apparatus 800 may further comprise radio interface (TRX) 820 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. The TRX may provide the apparatus capability to perform joint unicast-broadcast transmission or only broadcast transmission according to any of the examples given above.

The apparatus 800 may comprise user interface 840 comprising, for example, at least one keypad, a microphone, a touch display, a display, a speaker, etc. The user interface 840 may be used to control the respective apparatus by a user of the apparatus 800

In an embodiment, the apparatus 800 may be or be comprised in a network node, e.g. the network node performing the method described with reference to FIG. 2 and/or any other steps described above. For example, the apparatus 800 may be or be comprised in the access node/DU/relay 104.

According to an embodiment, with reference to FIG. 8, the control circuitry 810 comprises a symbol obtaining circuitry 812 configured to cause the apparatus 800 to perform at least operations of block 210; a mapping circuitry 814 configured to cause the apparatus 800 to perform at least operations of block 220; a parameter circuitry 816 configured to cause the apparatus 800 to perform at least operations of block 230; and a transmission circuitry 818 configured to cause the apparatus 800 to perform at least operations of block 240.

In an embodiment, the precoder 330, 630 comprises at least the mapping circuitry 814. Further, the precoder 330, 630 may also perform the functions of the parameter circuitry 816, and thus cause applying the parameters to the control units. As described above, the output of the precoder 330, 630 may be the parameters that are determined based on determining the mapping on the basis of the stored mapping(s) (e.g. as described with respect to FIG. 6) or based on determining mapping as described with respect to FIG. 3 (i.e. on the go and depending on CSI of the unicast UEs). In both cases, CSI for the broadcast UEs may not be available for the precoder 330, 630.

In an embodiment, at least some of the functionalities of the apparatus 800 may be shared between two physically separate devices, forming one operational entity. Therefore, the apparatus 800 may be seen to depict the operational entity comprising one or more physically separate devices for executing at least some of the described processes. As an example, the apparatus may comprise on or more of the elements described in the architecture examples of FIGS. 3 and 6.

According to an aspect there is provided a system comprising one or more apparatuses 800 and a plurality of UEs 100, 102. The UEs 100, 102 may comprise one or more unicast UEs and one or more broadcast UEs, or only broadcast UEs.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7, and 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7, and 9 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7, and 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7, and 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
obtaining, by a network node, a plurality of time domain symbols to be transmitted, the plurality of time domain symbols comprising time domain symbols to be broadcasted via a multiple input multiple output antenna system;
determining, by the network node, a mapping between the plurality of time domain symbols and parameters of control units associated with respective antenna elements of the multiple input multiple output antenna system, each control unit comprising a phase shifter, wherein the parameters of the control units control values of corresponding ones of the phase shifters to create a signal constellation to be transmitted, and wherein the mapping is performed based on an algorithm for minimizing distortion or bit error rate or both distortion and bit error rate at receiving user equipment;
causing by the network node the parameters to be applied at the control units; and
causing by the network node transmission of the plurality of time domain symbols via the multiple input multiple output antenna system.

2. The method of claim 1, wherein each control unit further comprises a switch, wherein the parameters further control states of corresponding ones of the switches.

3. The method of claim 1, wherein the obtained plurality of time domain symbols further comprise time domain symbols to be unicasted via the multiple input multiple output antenna system over the same, non-overlapping, or partially overlapping time-frequency resource, the method further comprising:
obtaining a time domain symbol combination based on unicast time domain symbols and broadcast time domain symbols; and
determining the mapping between the time domain symbol combination and the parameters of control units.

4. The method of claim 3, wherein the algorithm for minimizing the distortion or the bit error rate or both the distortion and the bit error rate at the receiving user equipment is based at least on interference information on one or more unicast user equipment and interference information on one or more broadcast user equipment.

5. The method of claim 4, wherein the algorithm for minimizing the distortion or the bit error rate or both the distortion and the bit error rate at the receiving user equipment is further based on additive noise information at the one or more unicast and one or more broadcast user equipment.

6. The method of claim 3, wherein the unicast time domain symbols are both amplitude and phase modulated.

7. The method of claim 3, wherein channel state information is available regarding the one or more unicast user equipment, and wherein channel state information is not available regarding the one or more broadcast user equipment.

8. The method of claim 1, wherein the time domain symbols to be broadcasted are both amplitude and phase modulated.

9. The method of claim 1 further comprising:
generating a mapping between time domain symbols and parameters of the control units;
storing the mapping in a look-up table; and utilizing the look-up table in the determining the mapping between the plurality of time domain symbols and the parameters of the control units.

10. The method of claim 9, wherein mappings between time domain symbols and parameters of the control units are generated and stored for a plurality of different antenna beam directions.

11. The method of claim 9 wherein the plurality of time domain symbols only comprise time domain symbols to be broadcasted, and wherein the plurality of time domain symbols are broadcasted via the multiple input multiple output antenna system system.

12. The method of claim 11, wherein the time domain symbols to be broadcasted are targeted to one or more user equipment whose channel state information is not available.

13. The method of claim 1, wherein the mapping between the plurality of time domain symbols and the parameters of the control units is determined at a nonlinear time domain symbol level precoder.

14. An apparatus, comprising:
at least one processor, and
at least one memory comprising a computer program code, wherein the at least one memory and the computer program code are configured, with the at least one processor, to cause the apparatus to:
obtain, by a network node, a plurality of time domain symbols to be transmitted, the plurality of time domain symbols comprising time domain symbols to be broadcasted via a multiple input multiple output antenna system;
determine, by the network node, a mapping between the plurality of time domain symbols and parameters of control units associated with respective antenna elements of the multiple input multiple output antenna system, each control unit comprising a phase shifter, wherein the parameters of the control units control values of corresponding ones of the phase shifters to create a signal constellation to be transmitted, and wherein the mapping is performed based on an algorithm for minimizing distortion or bit error rate or both distortion and bit error rate at receiving user equipment;
cause by the network node the parameters to be applied at the control units; and
cause by the network node transmission of the plurality of time domain symbols via the multiple input multiple output antenna system.

15. The apparatus of claim 14, wherein each control unit further comprises a switch, wherein the parameters further control states of corresponding ones of the switches.

16. The apparatus of claim 14, wherein the obtained plurality of time domain symbols further comprise time domain symbols to be unicasted via the multiple input multiple output antenna system over the same, non-overlapping, or partially overlapping time-frequency resource, the method further comprising:
obtaining a time domain symbol combination based on unicast time domain symbols and broadcast time domain symbols; and
determining the mapping between the time domain symbol combination and the parameters of control units.

17. The apparatus of claim 14, wherein the time domain symbols to be broadcasted are both amplitude and phase modulated.

18. The apparatus of claim 14, wherein the mapping between the plurality of time domain symbols and the parameters of the control units are determined at a nonlinear time domain symbol level precoder.

19. A computer program product comprising a non-transitory computer readable medium comprising program instructions stored thereon for causing network node to perform operations comprising:
obtaining, by a network node, a plurality of time domain symbols to be transmitted, the plurality of time domain symbols comprising time domain symbols to be broadcasted via a multiple input multiple output antenna system;
determining, by the network node, a mapping between the plurality of time domain symbols and parameters of control units associated with respective antenna elements of the multiple input multiple output antenna system, each control unit comprising a phase shifter, wherein the parameters of the control units control values of corresponding ones of the phase shifters to create a signal constellation to be transmitted, and wherein the mapping is performed based on an algorithm for minimizing distortion or bit error rate or both distortion and bit error rate at receiving user equipment;
causing by the network node the parameters to be applied at the control units; and
causing by the network node transmission of the plurality of time domain symbols via the multiple input multiple output antenna system.

* * * * *